Oct. 4, 1955   W. BLANCHARD, JR   2,719,592
REGULATOR COOLING STRUCTURE
Filed March 5, 1953   2 Sheets-Sheet 1
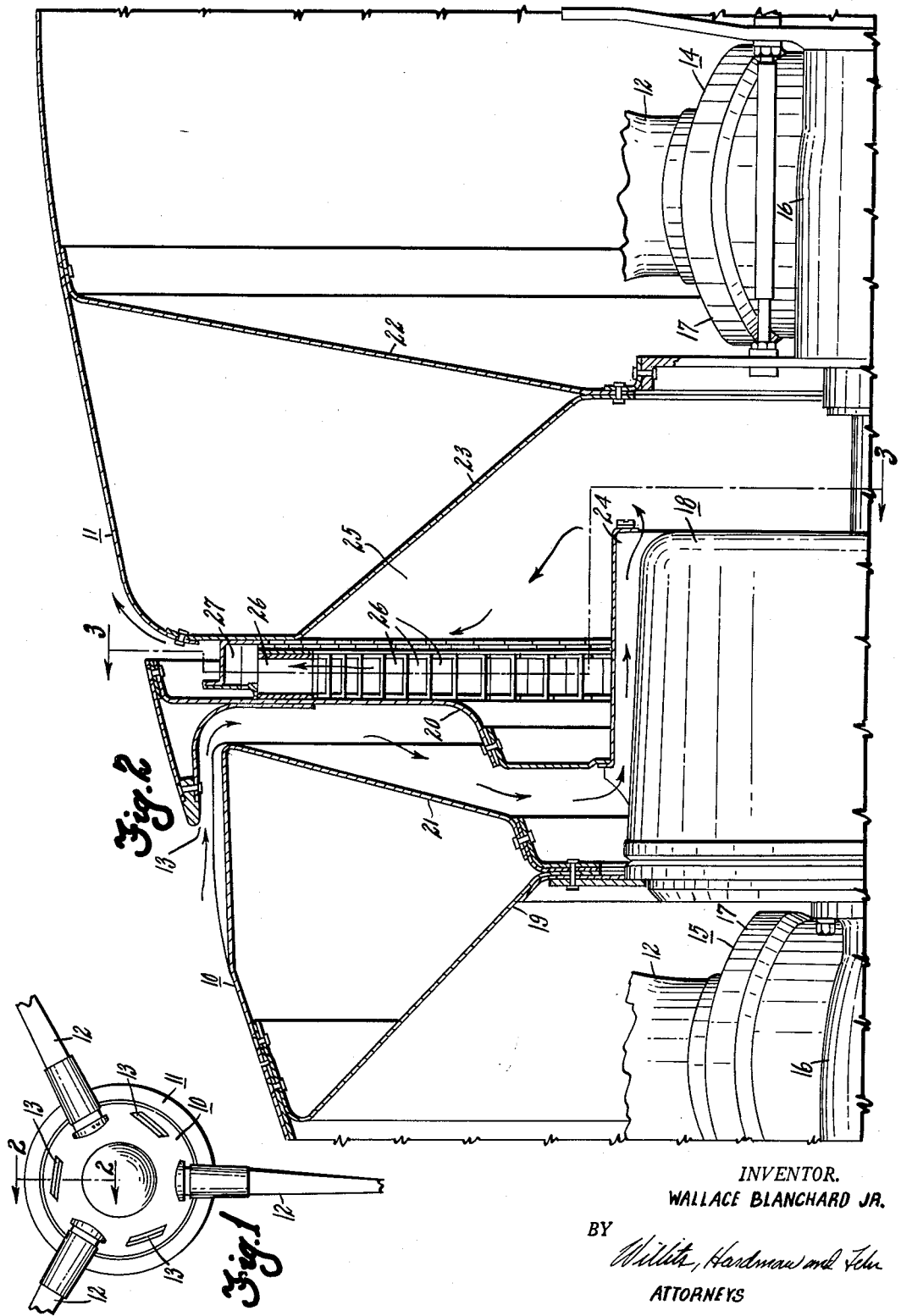
INVENTOR.
WALLACE BLANCHARD JR.
BY
*Willits, Hardman and Fehr*
ATTORNEYS

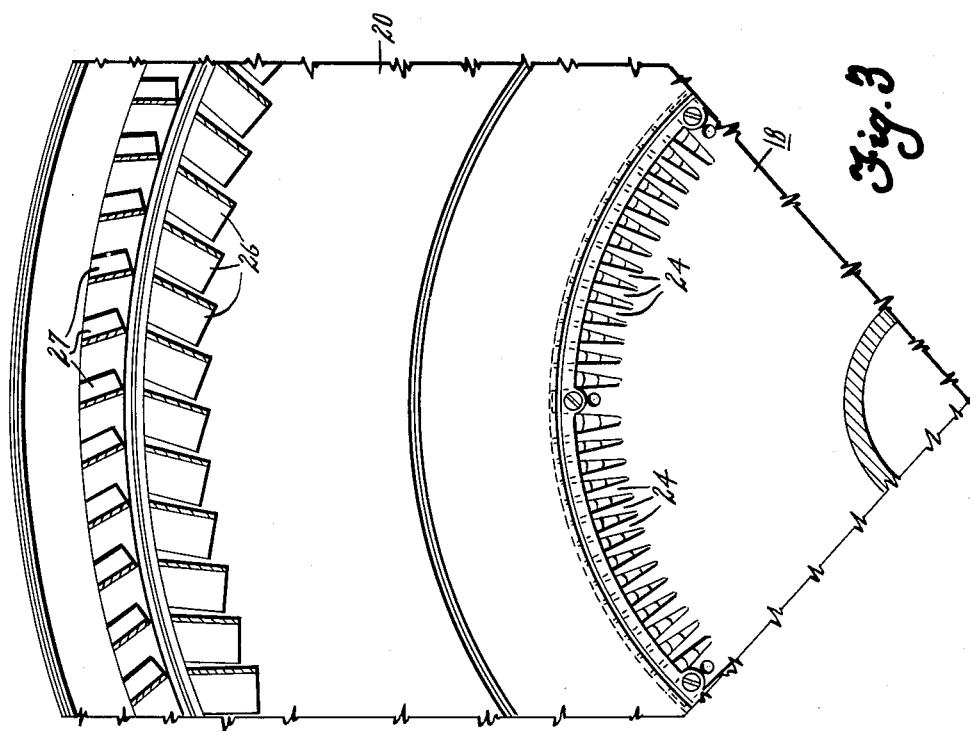

United States Patent Office 2,719,592
Patented Oct. 4, 1955

2,719,592

REGULATOR COOLING STRUCTURE

Wallace Blanchard, Jr., Winchester, Mass., assignor to General Motors Corporation, Detroit, Mich., a corporation of Delaware Application March 5, 1953, Serial No. 340,456

12 Claims. (Cl. 170—135.28)

The present invention pertains to variable pitch aircraft propellers and more particularly to means for cooling the reservoir structure of a hydraulically operated variable pitch propeller.

When hydraulically operated variable pitch propellers of the type disclosed in the Blanchard et al. Patents Nos. 2,307,101 and 2,307,102, are designed for operation by prime movers having substantial angular velocities, means must be provided for cooling the hydraulic medium employed in the servo actuated pitch control system. In mechanisms of this character a regulator structure serves the dual purpose of housing the control mechanism and forming a reservoir for the hydraulic medium. As the regulator structure includes relatively rotating assemblies, the temperature of the hydraulic medium contained therein rises during propeller rotation due to the generation of heat caused by fluid friction. This invention is concerned with means for dissipating a substantial portion of the generated heat so as to effectively preclude the temperature of the hydraulic medium from exceeding a predetermined temperature above which the hydraulic medium often times fails to perform its functions satisfactorily. Accordingly, one of my objects is to provide means for cooling a reservoir structure containing a hydraulic medium.

The aforementioned and other objects are accomplished in the present invention by diverting a portion of the air flow, caused by propeller rotation and aircraft movement, in contiguous relation with the finned periphery of the reservoir structure, and assisting the flow of air, thus diverted, by a propeller driven fan arrangement. Specifically, the reservoir, formed by the regulator structure, and the propeller hubs are enclosed by a spinner assembly. The present invention is of particular applicability in aircraft having oppositely rotating, coaxially disposed propeller hubs, with the regulator structure disposed between the propeller hubs. The forward section of the spinner assembly is constrained to rotate with the outboard propeller unit while the aft section of the spinner assembly is constrained to rotate with the inboard propeller unit. The exterior periphery of the regulator housing has a plurality of longitudinally extending, circumferentially spaced heat exchange fins thereon. The forward section, of the spinner assembly, has a plurality of circumferentially spaced peripheral openings, the openings functioning as scoops to divert a portion of the air flow across the spinner surface to the interior of the spinner assembly and into heat exchange relation with the finned regulator periphery. In addition, a plurality of sets of radially spaced, oppositely rotating fan blades, attached to juxtaposed portions of the inboard spinner sections, are employed to assist the flow of air into, and exhaust air from, the space surrounding the regulator structure.

Further objects and advantages of the present invention will be apparent from the following description, reference being had to the accompanying drawings wherein a preferred embodiment of the present invention is clearly shown.

In the drawings:

Fig. 1 is a fragmentary view in elevation of a propeller assembly incorporating this invention.

Fig. 2 is a fragmentary view, partly in section and partly in elevation, taken on line 2—2 of Fig. 1.

Fig. 3 is a fragmentary, sectional view taken on line 3—3 of Fig. 2.

With particular reference to Fig. 1, a variable pitch propeller unit is shown including a spinner assembly having a forward section 10 and an aft section 11. Each spinner section has a plurality of cutouts through which blades 12 of the variable pitch propeller units extend. The cutouts in each spinner section are substantially 120° apart and the forward and aft spinner sections are constrained to rotate in opposite directions as will appear more fully hereinafter.

Referring to Figs. 1 and 2, the forward spinner section 10 has three circumferentially spaced openings 13 therein, the openings 13 being equidistantly spaced between the cutout openings of the spinner section previously referred to. Each of the openings 13 functions as an air scoop to divert a portion of the air flowing across the outer periphery of the spinner assembly into the interior of the spinner assembly between the forward and aft spinner sections.

The propeller assembly is adapted to be supported in an aircraft nacelle which houses an engine, not shown. The engine drives a pair of shafts, not shown, in opposite directions, which shafts are respectively connected to an inboard propeller unit 14 and an outboard propeller unit 15. Each propeller unit includes a hub 16 having radially extending sockets 17 within which the blades 12 are supported for rotation about their longitudinal axes throughout a range of pitch angles. The blades 12 are shifted in their sockets by means of fluid operated motors, not shown, enclosed within each blade shank in a manner similar to that disclosed in the aforementioned Blanchard et al. patents. Control of the pitch shifting movements of the blades is effected by means of a self-contained hydraulic regulator 18 mounted between the propeller units 14 and 15 and having portions adapted to rotate with each of the propeller units in opposite directions. Fluid connection between the fluid pressure operated blade motors and the regulator 18 is effected by passages in the supporting structure interconnecting the propeller units. The oppositely rotating propeller assembly may be constructed in a manner similar to that shown in the Blanchard et al. Patent No. 2,362,444. Suffice it here to say that the control structure contained within regulator 18 may be employed to maintain propeller speed substantially constant.

The spinner assembly sections are supported by bulkheads attached to oppositely rotating portions of the propeller units. As seen in Fig. 2, the forward spinner section 10 is supported by bulkheads 19 and 20 which are anchored to the regulator structure 18. The bulkhead 20 forms a partition between spinner sections 10 and 11 for a reason which will later be apparent. Bulkhead 19 has attached thereto a baffle assembly 21 which cooperates with the bulkhead 20 to form a passage for the air diverted through the opening 13. The casing of the regulator 18 is anchored to rotate with the outboard propeller unit 15. Disposed within the regulator 18 are portions, not shown, which rotate with the inboard propeller unit 14. Relative rotation between several portions of the regulator is essential to insure operation of gear type pumps mounted within the regulator, in a manner similar to that shown in United States Patent 2,612,958, Richardson, and operable to increase the pressure of the hydraulic medium contained therein for effecting actuation of the blade motors in a conventional manner, not shown. The aft section 11 of the spinner assembly is supported by bulkhead assembly 22 attached to the hub of the inboard propeller unit 14. The bulkhead 22 likewise supports a baffle 23 which directs the flow of air to a fan assembly to be described.

By reason of the fact that portions of the regulator structure rotate in opposite directions, substantial amounts of heat are generated in the hydraulic medium contained within the regulator. When the propeller units are designed for operation with prime movers, such as gas turbines which have exceedingly high angular velocity, it becomes necessary to cool the hydraulic medium employed in the pitch control system. Accordingly, with reference to Figs. 2 and 3, the periphery of the regulator structure 18 has formed thereon a plurality of circumferentially spaced, axially extending heat exchange fins 24. The baffle assembly 20 is suitably anchored to the forward portion of the finned regulator periphery so as to direct the flow of air through the openings 13 along the finned regulator periphery so that the heat generated by propeller rotation may be effectively dissipated. In order to assist the flow of air through the scoop openings 13 caused by propeller rotation and forward movement of the aircraft, a two-stage radial flow fan is employed to exhaust air from the space 25, as shown in Fig. 2.

Referring to Fig. 3, the first stage of the radial fan arrangement comprises a plurality of blades 26 attached to baffle assembly 20 and thereby constrained to rotate with the outboard propeller unit 15. The second stage of the radial flow fan arrangement comprises a plurality of oppositely directed blades 27 attached to the baffle 23 and constrained to rotate with the inboard propeller unit 14. Accordingly, upon propeller units rotation, fan blades 26 and 27 will rotate in opposite directions, the construction and arrangement being such that air will be exhausted from the space 25 to the atmosphere through the opening provided between the forward and aft spinner sections 10 and 11, respectively.

During propeller rotation, the air flow for cooling the regulator structure, is in a direction indicated by the arrows in Fig. 2. From an inspection of this figure, it is seen that the air is confined between baffle portions 20 and 21 and flows between the fins in contiguous relation to the regulator structure 18. The air subsequently flows into the space 25 which is then exhausted through the space between the forward and aft spinner sections by the two-stage radial flow fan. From the foregoing, it is apparent that the present invention provides a novel arrangement for dissipating the heat generated in the rotating reservoir structure of a variable pitch propeller assembly.

While the embodiment of the present invention as herein disclosed, constitutes a preferred form, it is to be understood that other forms might be adopted.

What is claimed is as follows:

1. In an aircraft, the combination including; a variable pitch propeller, means operatively connected to said propeller for effecting rotation thereof, fluid pressure operated means associated with said propeller for varying the pitch position thereof including a reservoir structure containing fluid medium, a spinner connected to rotate with said propeller and enclosing said reservoir structure, said spinner having at least one peripherial opening therein and fan means within the spinner operably connected to said propeller and driven thereby to induce air flow through said spinner opening in contiguous relation to said reservoir structure to effect cooling of said structure and the fluid medium contained therein.

2. In an aircraft, the combination including; a variable pitch propeller, means operatively connected to said propeller for effecting rotation thereof, hydraulically operated mechanism operatively connected to said propeller for maintaining propeller speed substantially constant by varying the pitch position thereof including a reservoir structure containing hydraulic medium, a spinner connected to rotate with said propeller and enclosing said reservoir structure, said spinner having at least one peripheral opening therein and fan means within the spinner operably connected to said propeller and driven thereby to induce air flow through said spinner opening in contiguous relation to said reservoir structure to effect cooling of said structure and the fluid medium contained therein.

3. In an aircraft, the combination including; a variable pitch propeller, means operable to rotate said propeller, fluid pressure operated means associated with said propeller for varying the pitch position thereof including a reservoir structure containing fluid medium, a spinner connected to rotate with said propeller and enclosing said reservoir structure, said spinner having at least one peripheral opening therein, and means within said spinner including a fan operatively connected to said propeller and driven thereby to induce air flow in contiguous relation to said reservoir structure to effect cooling thereof.

4. The combination set forth in claim 3, wherein said reservoir has a finned periphery to form passages interconnecting said spinner opening and said fan and facilitate heat exchange between said reservoir and the induced air flow.

5. In combination with a variable pitch propeller assembly embodying oppositely rotatable propeller units controlled by hydraulically actuated mechanism, a reservoir structure containing hydraulic medium disposed between the propeller units and operatively connected with one of said propeller units for rotation therewith, a spinner assembly having a pair of sections rotatable in opposite directions, said spinner assembly enclosing portions of the propeller units and the reservoir structure, a plurality of circumferentially spaced openings in one of said spinner sections constituting air scoops, and means supported by said one spinner section for directing the air diverted through said air scoops in heat exchange relationship with the periphery of said reservoir structure.

6. In combination with a variable pitch propeller assembly embodying oppositely rotatable propeller units controlled by hydraulically actuated mechanism, a reservoir structure containing hydraulic medium disposed between the propeller units and operatively connected with one of said propeller units for rotation therewith, a spinner assembly having a pair of sections rotatable in opposite directions, said spinner assembly enclosing portions of the propeller units and the reservoir structure, a plurality of circumferentially spaced openings in one of said spinner sections constituting air scoops, means supported by said one spinner section for directing the air diverted through said air scoops in heat exchange relationship with the periphery of said reservoir, and means operatively connected to said propeller units for exhausting the heated air from the space surrounding the reservoir structure.

7. The combination set forth in claim 5, wherein the reservoir structure has a finned periphery to form passages interconnecting said air scoops and said last recited means and facilitate heat exchange with the diverted air flow.

8. The combination set forth in claim 6, wherein the means for exhausting the air from the space surrounding the reservoir structure includes a multistage radial flow fan.

9. The combination set forth in claim 8, wherein said multi-stage radial flow fan includes a first set of blades constrained to rotate with one of said spinner sections and a second set of blades constrained to rotate with the other spinner section.

10. In an aircraft having oppositely rotatable variable pitch propellers and fluid pressure actuated means for adjusting the pitch of said propellers, the combination including, a reservoir structure rotatable with one of said propellers and containing fluid medium for actuating the pitch adjusting means, a spinner assembly having a pair of spaced sections connected to said propellers for rotation in opposite directions, said spinner assembly enclosing said reservoir structure, one spinner section having at least one peripheral opening, baffle means supported by said one spinner section for directing air flow through said opening into heat exchange relationship with said reservoir structure, and a fan driven by said propellers for exhausting heated air from the space surrounding said reservoir through the space between said spinner sections.

11. In an aircraft having oppositely rotatable variable pitch propellers and fluid pressure actuated means for adjusting the pitch of said propellers, the combination including, a reservoir structure rotatable with one of said propellers and containing fluid medium for actuating said pitch adjusting means, a spinner assembly having a pair of sections connected to said propellers for rotation in opposite directions, said spinner assembly enclosing said reservoir structure, one of said spinner sections having at least one peripheral opening therein, baffle means supported by said one spinner section for directing air flow through said opening into heat exchange relationship with said reservoir structure, and a fan driven by said propellers for exhausting heated air from the space surrounding said reservoir structure, said fan comprising a first set of blades carried by said one spinner section and rotatable therewith, and a second set of blades carried by and rotatable with the other spinner section.

12. The combination set forth in claim 11 wherein each set of blades is arranged in an annular row, and wherein said annular rows are radially spaced from each other.

References Cited in the file of this patent
UNITED STATES PATENTS

| | | |
|---|---|---|
| 2,503,451 | Palmatier | Apr. 11, 1950 |
| 2,525,260 | Geyer | Oct. 10, 1950 |
| 2,586,054 | Jonas | Feb. 19, 1952 |
| 2,622,688 | Lee | Dec. 23, 1952 |
| 2,627,927 | Mergen | Feb. 10, 1953 |